United States Patent
Matsuzaki

Patent Number: 5,235,514
Date of Patent: Aug. 10, 1993

[54] APPARATUS FOR ESTIMATING CURRENT HEADING USING MAGNETIC AND ANGULAR VELOCITY SENSORS

[75] Inventor: Shinichi Matsuzaki, Osaka, Japan

[73] Assignee: Sumitomo Electric Industries, Ltd., Osaka, Japan

[21] Appl. No.: 674,603

[22] Filed: Mar. 25, 1991

[30] Foreign Application Priority Data

Mar. 28, 1990 [JP] Japan .................. 2-081582

[51] Int. Cl.⁵ .................................... G06F 15/50
[52] U.S. Cl. ............................ 364/454; 340/995; 364/571.02
[58] Field of Search ........... 364/559, 571.01, 460, 364/449, 453, 454, 457, 450, 571.02; 33/356, 357, 318, 319, 324, 326; 73/178 R; 340/988, 995

[56] References Cited

U.S. PATENT DOCUMENTS

| | | | |
|---|---|---|---|
| 4,347,730 | 9/1982 | Fisher et al. | 364/571.05 |
| 4,429,469 | 2/1984 | Tsushima et al. | 364/559 |
| 4,521,777 | 6/1985 | Nakamura et al. | 364/460 |
| 4,734,863 | 3/1988 | Honey et al. | 364/449 |
| 4,783,744 | 11/1988 | Yueh | 364/571.01 |
| 4,831,544 | 5/1989 | Hojo et al. | 364/453 |
| 4,862,398 | 8/1989 | Shimizu et al. | 364/449 |
| 4,890,233 | 12/1989 | Ando et al. | 364/460 |
| 5,067,083 | 11/1991 | Nakayama et al. | 364/453 |
| 5,115,238 | 5/1992 | Shimizu et al. | 340/988 |

Primary Examiner—Thomas G. Black
Assistant Examiner—Michael Zanelli
Attorney, Agent, or Firm—Lane, Aitken & McCann

[57] ABSTRACT

A heading detecting apparatus for estimating a current heading of a moving body is described that individually analyzes and evaluates error factors that are respectively included in the heading data of a magnetic sensor and in the angular velocity data of a turning angular velocity sensor (e.g., optical fiber gyro, mechanical gyro, vibration gyro, gas rate gyro) and determines the rate of use of the output data of the turning angular velocity and magnetic sensors.

3 Claims, 5 Drawing Sheets

APPARATUS FOR ESTIMATING CURRENT HEADING USING MAGNETIC AND ANGULAR VELOCITY SENSORS

FIELD OF THE INVENTION

The present invention relates in general to a heading (azimuth) detecting apparatus, and in particular to such an apparatus which detects the heading of yawing direction of a moving body by the use of a magnetic sensor and a turning angular velocity sensor (e.g., optical fiber gyro, mechanical gyro, vibration gyro, gas rate gyro) for sensing the moving direction and turning angular velocity of the moving body.

DESCRIPTION OF THE PRIOR ART

As a method for providing information about the actual location of a vehicle traveling streets, aircraft navigating air routes or ship navigating sea routes, there is known "dead reckoning", in which a distance sensor, a heading sensor (magnetic sensor or turning angular velocity sensor) and a processing unit (e.g., computer) for processing distance and heading data obtained from the distance and heading sensors are employed and the current location data of a moving body are obtained by using an amount of distance change $\delta l$ and a heading $\theta$ (case of the magnetic sensor) or amount of heading change $\delta\theta$ (case of the turning angular velocity sensor). A description of the "vehicle" will hereinafter be given, and in a case where a "travel" of the vehicle and a "navigation" of the aircraft or ship are used together, the "travel" is used. In the dead reckoning method, the east-west directional component $\delta x$ ($=\delta l$ times cos $\theta$) and south-north directional component $\delta y$ ($=\delta l$ times sin $\theta$) of the distance change amount $\delta l$ that occurs as the vehicle moves along a street are calculated, and current location output data (Px, Py) are obtained by adding the calculated components $\delta x$ and $\delta y$ to the previous location output data (Px', Py'). However, conventional systems using dead reckoning have their disadvantages in that the accumulation of error occurs due to inherent limitations on the achievable accuracy of the heading sensor.

That is to say, when the heading sensor is a magnetic sensor which senses earth magnetism for obtaining the absolute heading of a moving body, the magnetic sensor senses the feeble intensity of the Earth's magnetic field. Therefore, if the moving body is magnetized, an error will occur in the output data from the magnetic sensor. In order to compensate for this error, the initialization of the magnetic sensor is performed. However, when the moving body passes through regions including magnetic disturbance, such as railroad crossings, places wherein power cables are buried, iron bridges, highways with sound insulating walls and high buildings, the moving body is subjected to influence of the strong electromagnetic field and therefore the amount of the magnetization of the moving body varies. For this reason, sometimes the error occurs again during traveling. Therefore, if the magnetic sensor output data including such magnetic disturbance is detected with accuracy and removed, an accurate heading of the moving body cannot be obtained.

When, on the other hand, the turning angular velocity sensor is employed, it is known that error in the sensor output data will appear frequently at the time changes in the heading become more than a predetermined value, at the time the power source is turned on, at the time the vehicle travels at very slow speeds or at the time it is detected that the vehicle is traveling on rough roads such as mountain roads. Unless compensation for this error is made, the dead reckoned positions will become increasingly imprecise or inaccurate.

Then, it has been proposed that the turning angular velocity sensor and the magnetic sensor are both used jointly as a heading sensor. If either the turning angular velocity sensor output data or the magnetic sensor output data is reduced in reliability, one data can be compensated for by the other data.

Then, in the heading detecting apparatus, in which a current location of a moving body is obtained by reading and storing output data of the turning angular velocity an magnetic sensors and calculating the current heading of the moving body from those sensor output data and the previous estimated heading, a current estimated heading of the moving body can be obtained by calculating Kalman filter gain in consideration of characteristic errors inherently included in the output data from the turning angular velocity and magnetic sensors and by processing the magnetic sensor heading data and the heading data calculated from the turning angular velocity sensor output with a weighting processing method based on the calculated Kalman filter gain. However, in this method, it becomes a problem how the characteristic error components included in the output data from the turning angular velocity and magnetic sensors are evaluated.

That is to say, the individual error components are evaluated by some method and if these are set to constant values, the processing can be most easily performed. However, setting to the constant values is insufficient because the error component in the output of the magnetic sensor is sometimes increased rapidly during traveling by the changes in the magnetized amount and it is desirable to evaluate the error components accurately at real time by some method. In addition, since an offset that is included in the output data from the turning angular velocity sensor varies with time, it is necessary to take into consideration the error in the turning angular velocity sensor data resulting from that variation.

The inventor of the present invention has proposed a heading detecting apparatus (Japanese Patent Application No. 1-329851), which measures the output data from the turning angular velocity and magnetic sensors and processes them at real time and is capable of accurately estimate the current heading of a moving body with the aid of the data higher in reliability among the both output data from the turning angular velocity and magnetic sensors. In this apparatus, only a variation value that is included in the final output data from the turning angular velocity and magnetic sensors is measured and the processing is performed in accordance with the measured variation value. Therefore, this apparatus does not take into consideration individual error factors that are respectively included in the output data of the turning angular velocity and magnetic sensors.

Accordingly, it is an object of the present invention to provide a heading detecting apparatus which is capable of estimating a current heading of a moving body accurately by individually analyzing and evaluating the error factors that are respectively included in the heading data of the magnetic sensor and in the angular velocity data of the turning angular velocity sensor and by determining the rate of use of the output data of the turning angular velocity and magnetic sensors.

SUMMARY OF THE INVENTION

In order to achieve the above object, a heading detecting apparatus of the present invention, as shown in FIG. 1, comprises a turning angular velocity sensor for sensing a heading of a moving body and a magnetic sensor for sensing a heading of the moving body. First means (A) is connected to the turning angular velocity sensor for calculating an offset value that is included in an output of the turning angular velocity sensor as the moving body is in its stopped state and for calculating an error of the offset value. Second means (B) is connected to the first means (A) for calculating a time change rate of the offset value and an error of the time change rate. Third means (C) is connected to the first means (A) and to the second means (B) for calculating a current error that is included in the output of the turning angular velocity sensor, in accordance with the error of the offset value multiplied by an elapsed time after the moving body starts traveling and with the error of the time change rate of the offset value multiplied by the elapsed time after the moving body starts traveling. Fourth means (D) is connected to the magnetic sensor for calculating a magnetized amount of the moving body and an error of the magnetized amount from heading data outputted from the magnetic sensor under a predetermined condition as the moving body is in its traveling state. Fifth means (E) is connected to the fourth means (D) for calculating a change in the magnetized amount of the moving body and an error of the change from heading data outputted from the magnetic sensor as the moving body is in its traveling state. Sixth means (F) is connected to the fifth means (E) for calculating a current magnetized amount of the moving body and an error of the current magnetized amount in accordance with the magnetized amount of the moving body and the error of the magnetized amount that were calculated by the fourth means (D) and with the change in the magnetized amount of the moving body and the error of the change that were calculated by the fifth means (E). Seventh means (G) is connected to the turning angular velocity and magnetic sensors for calculating a change in a difference between the heading data from the turning angular velocity sensor and the heading data calculated from the output of the magnetic sensor. Eighth means (H) is connected to the sixth means (F) and to the seventh means (G) for calculating an error that is included in the heading output from the magnetic sensor, in accordance with the change in the difference between the heading data from the magnetic sensor and the heading data to be calculated from the output of the turning angular velocity sensor that was calculated by the seventh means (G) and in accordance with the error of the current magnetized amount of the moving body calculated by the sixth means (F). Ninth means (I) is connected to the third means (C) and to the eighth means (H) for calculating a Kalman filter gain by calculating a reliability of each of the output data of the turning angular velocity and magnetic sensors from the error in the output of the turning angular velocity sensor calculated by the third means (C) and from the error in the heading output data of the magnetic sensor calculated by the eighth means (H). Tenth means (J) is connected to the ninth means (I) for calculating a current estimated heading of the moving body by processing the heading data calculated from the magnetic sensor output and the heading data calculated from the turning angular velocity sensor output with a weighting processing based upon the Kalman filter gain.

The first means (A) calculates an offset value that is included in an output of the turning angular velocity sensor as the moving body is in its stopped state and calculates the error of the offset value. The reason why the data from the turning angular velocity sensor a the moving body is in its stopped state are sampled is that only the offset value is included in the turning angular velocity sensor output. Then, the second means (B) connected to the first means (A) calculates a time change rate of the offset value and an error of the time change rate. By calculating the time change rate, the offset value and the error of the offset value as the moving body is in its traveling state can be estimated. Then, based upon the error of the offset value multiplied by an elapsed time after the moving body starts traveling and upon the error of the time change rate of the offset value multiplied by the elapsed time after the moving body starts traveling, the third means (C) connected to the first means (A) and to the second means (B) calculates a current error that is included in the output of the turning angular velocity sensor. This makes it possible to estimate the offset value and the offset value error at any time.

Then, the fourth means (D) connected to the magnetic sensor calculates a magnetized amount of the moving body and an error of the magnetized amount from heading data outputted from the magnetic sensor under a predetermined condition as the moving body is in its traveling state, and the fifth means (E) connected to the fourth means (D) calculates a change in the magnetized amount of the moving body and an error of the change from the heading data outputted from the magnetic sensor as the moving body is in its traveling state. The "predetermined condition as the moving body is in its traveling state" is a condition that, for example, during curve traveling and the like, the magnetized amount of the moving body and the error of the magnetized amount can be calculated. The reason why the change in the magnetized amount of the moving body is calculated by the means (E) is that sometimes the magnetized amount changes when the moving body passes through railroad crossings, etc.

Next, based upon the magnetized amount of the moving body and the error of the magnetized amount that were calculated by the fourth means (D) and upon the change in the magnetized amount of the moving body and the error of the change that were calculated by the fifth means (E), the sixth means (F) connected to the fifth means (E) calculates a current magnetized amount of the moving body and an error of the current magnetized amount.

Then, the seventh means (G) connected to the turning angular velocity and magnetic sensors calculates a change in a difference between the heading data from the turning angular velocity sensor and the heading data calculated from the output of the magnetic sensor. Sometimes a difference occurs between the heading data from the turning angular velocity sensor and the heading data calculated from the output of the magnetic sensor. However, for a short term, this difference is caused by the error in the heading data of the magnetic sensor rather than by the error in the heading data calculated from the output of the angular velocity sensor and therefore is thought of as the heading data error of the magnetic sensor.

In the eighth means (H) connected to the sixth means (F) and to the seventh means (G), an error that is included in the heading output from the magnetic sensor is calculated in accordance with the change in the difference between the heading data from the magnetic sensor and the heading data to be calculated from the output of the turning angular velocity sensor that was calculated by the seventh means (G) and in accordance with the error of the current magnetized amount of the moving body calculated by the sixth means (F).

Then the ninth means (I) connected to the third means (C) and to the eighth means (H) calculates a Kalman filter gain by calculating a reliability of each of the output data of the turning angular velocity and magnetic sensors from the error in the output of the turning angular velocity sensor calculated by the third means (C) and from the error in the heading output data of the magnetic sensor calculated by the eighth means (H).

Finally, in the tenth means (J), a current estimated heading of the moving body is calculated by processing the heading data calculated from the magnetic sensor output and the heading data calculated from the turning angular velocity sensor output with a weighting processing based upon the Kalman filter gain. That is to say, according to the present invention, the current heading of the moving body can be estimated accurately by individually analyzing and evaluating the error factors that are respectively included in the heading data of the magnetic sensor and in the angular velocity data of the turning angular velocity sensor and by determining the rate of use of the output data of the turning angular velocity and magnetic sensors.

It is noted that in addition to the errors described above, various errors, such as an error of quantization and the like caused at the time of A/D conversion and errors that are normally considered, may also be adopted.

BRIEF DESCRIPTION OF THE DRAWINGS

The features and advantages of a heading detecting apparatus according to the present invention will be more clearly understood from the following description taken in conjunction with the accompanying drawings.

DESCRIPTION OF THE PREFERRED EMBODIMENT

Figure 1:
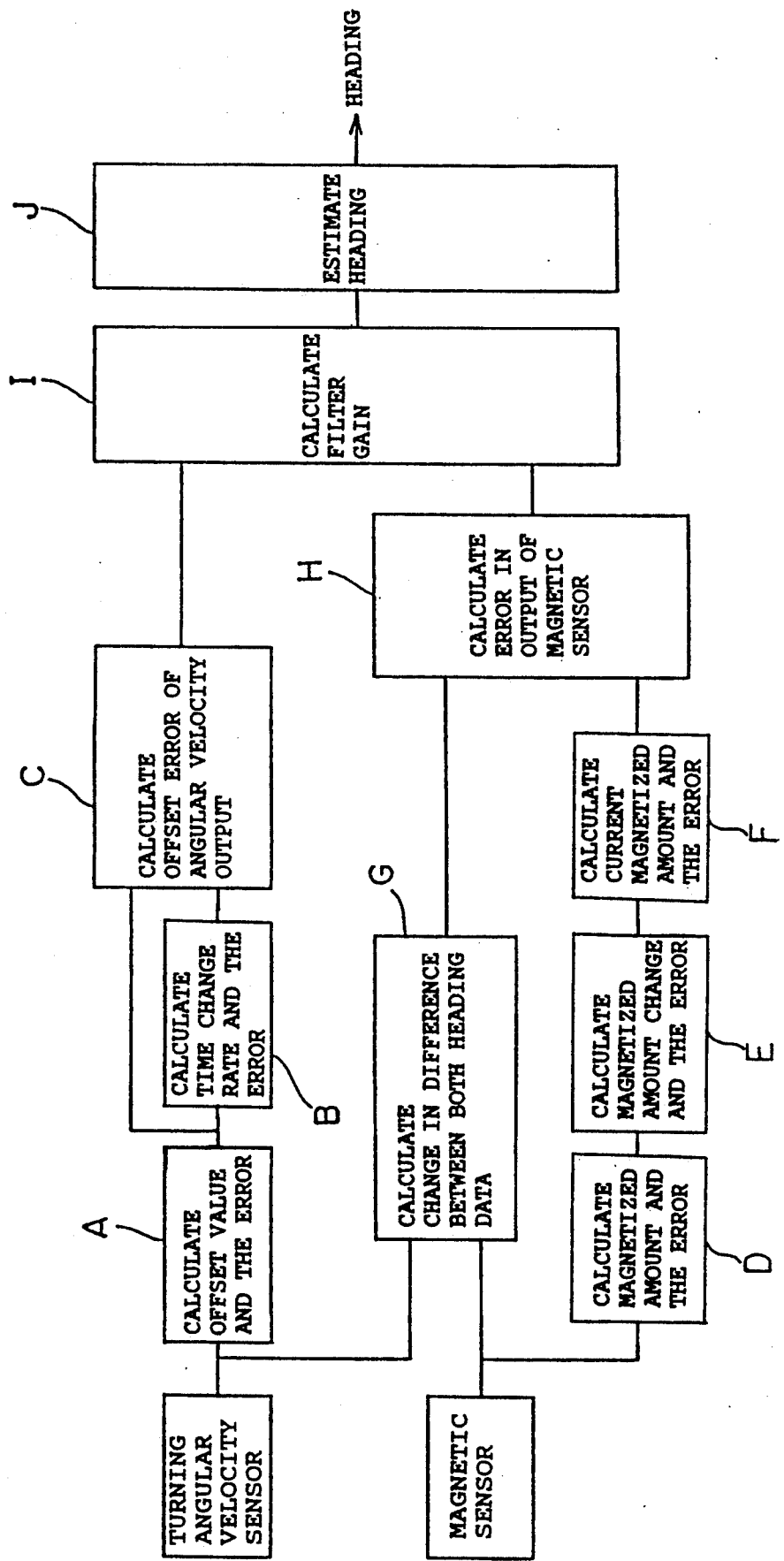
FIG. 1 is a block diagram of a heading detecting apparatus incorporating the principles of this invention.
Figure 2:
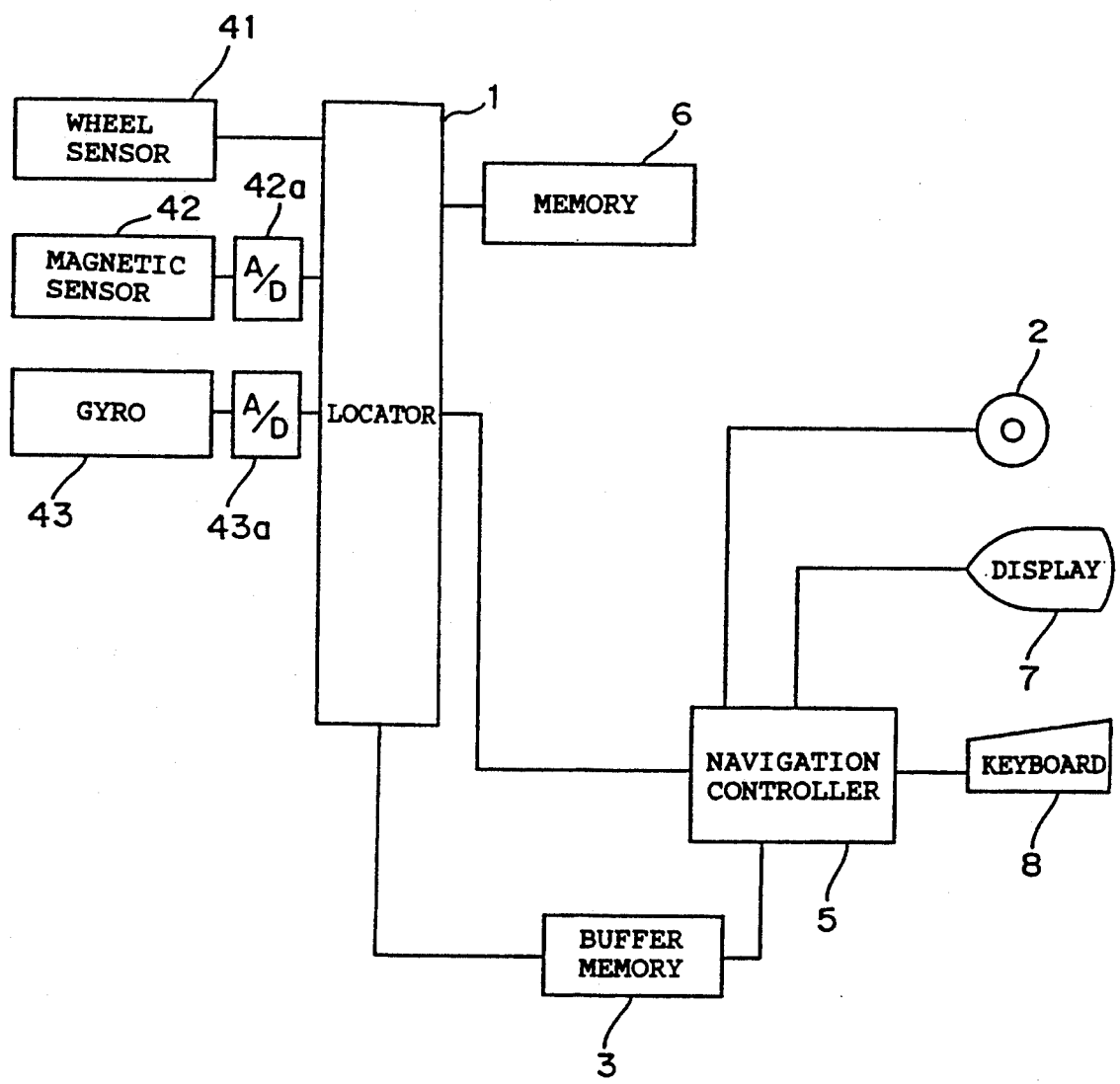
FIG. 2 is a block diagram illustrating one embodiment of the heading detecting apparatus.

FIG. 2 illustrates a preferred embodiment of a heading detecting apparatus of the present invention which may be employed in a vehicle navigation system. The heading detecting apparatus comprises a wheel sensor 41 which senses the number of rotations of the left and right wheels (not shown) respectively of a vehicle (this sensor is used as a distance sensor which senses distances traveled by the vehicle), a magnetic sensor 42 for sensing the heading of the vehicle, a first A/D (analog-to-digital) converter 42a connected to the magnetic sensor 42, a gyro 43 (which is selected from among an optical fiber gyro which reads a turning angular velocity as a phase change of interference light, a vibration gyro which senses a turning angular velocity with the aid of cantilever vibration technique of a piezoelectric element, a mechanical gyro, etc. This gyro 43 uses as a turning angular velocity sensor which senses the heading of the vehicle), and a second A/D 43a converter connected to the gyro 43. The heading detecting apparatus further comprises a road map memory 2 for storing road map data, a locator 1 which calculates an estimated heading of the vehicle in accordance with the output data sensed by the gyro 43 and magnetic sensor 42 and also calculates location output data of the vehicle with the calculated estimated heading and the data of the wheel sensor 41, a buffer memory 3 to which the result of the calculation is inputted from the locator 1, a data memory 6 connected to the locator 1 for storing magnetized amount data that are included in the data of the magnetic sensor 42 and a dispersion of the magnetized amount data and for storing gyro offset data that are included in each data of the gyro and a dispersion of the gyro offset data, a navigation controller 6, a display 7 connected to the navigation controller 6 for displaying the read out vehicle current location on the map, and a keyboard 8 connected to the navigation controller 6.

In the locator 1 described above, the number of rotations of the wheel is obtained by counting the number of the pulses outputted from the wheel sensor 41 with a counter (not shown), and travel distance output data per unit time are calculated by multiplying the count output data of the counter by a predetermined constant number indicative of a distance per one count. Also, a relative change in the vehicle heading is obtained from the gyro 43. Then, based on the relative change and the absolute heading output data of the magnetic sensor 42, the locator 1 calculates the heading output data of the vehicle, as will be described below.

The above described road map memory 2 stores road map data of a given area in advance and comprises a semiconductor memory, cassette tape, CD-ROM, IC memory, DAT or the like.

The above described display 7 comprises a CRT display, crystalline liquid display or the like and displays a road map that the vehicle is traveling and a current location of the vehicle.

The above described navigation controller 5 is constituted by a figure processor, an image processing memory and the like, and generates instructions to perform a retrieval of the map on the display 7, switching of scale, scrolling, a display of the vehicle current location and like.

The above described memory 6 stores a gyro offset value Bo, a dispersion Bvo of the gyro offset, an estimated change rate m of the gyro offset, a dispersion mv of a gyro offset change rate, a magnetized amount Mn, a dispersion value $Xn^2$ of the magnetized amount Mn, a magnetized amount change $\delta Mn$, and a dispersion value $Yn^2$ of the magnetized amount change $\delta Mn$. These values are calculated as follows.

The output data $\delta\theta^G$ of the gyro 43 and the output data $\theta^H$ of the magnetic sensor 42 are sampled every a constant time and the number of sampling is represented by a subscript of n.

The output data $\delta\theta^G n$ of the gyro 43 as the vehicle is in its stopped state is normally zero, but the output will appear if an offset (bias) has occurred in the gyro. The gyro offset value Bo is calculated as follows:

$$Bo = \frac{\Sigma \delta\theta^G n}{N}$$

where N is the number of data as the vehicle is in its stopped state. Therefore, the gyro offset value Bo represents a mean value of the gyro offset data.

The dispersion value Bvo of the gyro offset represents the degree of fluctuation that the gyro offset value Bo has and can be written as follows:

$$Bo = \text{constant} + \frac{\text{dispersion of } \delta\theta^G n}{\sqrt{N}}$$

The constant of the first term of the above equation corresponds to an error of quantization and the second term is a term relating to the number of data, that is, the time needed for sampling data. If the stopped time of the vehicle is longer, the dispersion value Bvo of the gyro offset will become smaller.

The estimated change rate m of the gyro offset is an amount indicative of a gradient between an gyro offset value Bo(to) in time (to) immediately after the vehicle is stopped and an gyro offset value Bo(t1) in time (t1) immediately before the next traveling of the vehicle and is calculated as follows:

$$Bo = \frac{Bo(t1) - Bo(to)}{t1 - to}$$

Figure 3:
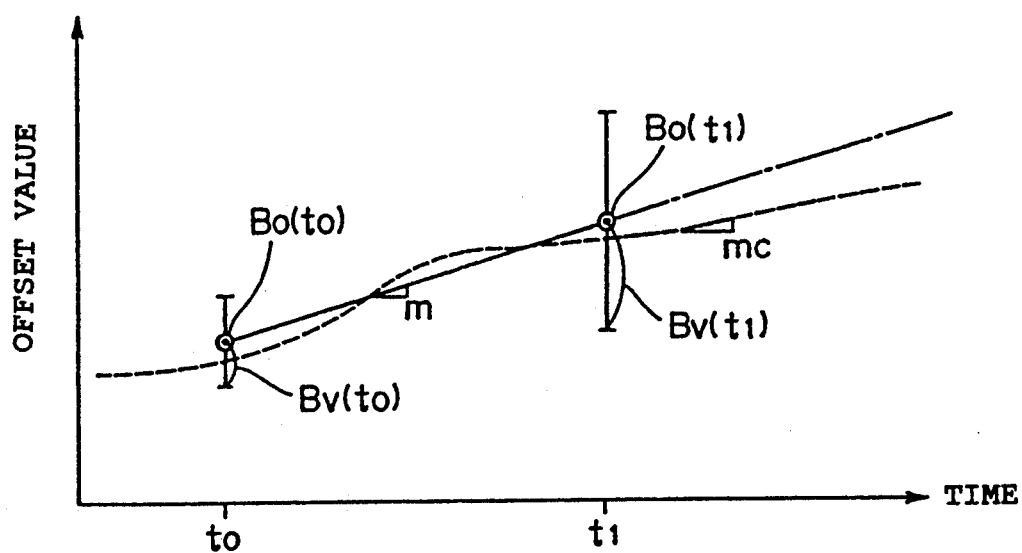
FIG. 3 is a diagram showing how offset values of the output of the gyro of FIG. 1 are varied.

FIG. 3 shows fluctuations of the gyro offset values with the offset value taken on the ordinate and with time on abscissa, and actual fluctuations of the gyro offset values are shown by the broken line. The gradient of estimated gyro offset values between time (to) and time (t1) is represented by reference character m. Also, the gradient of actual gyro offset values is represented by reference character mc.

The dispersion mv of the gyro offset change rate is an amount corresponding to a difference between the estimated change rate m of the gyro offset and the actual change rate mc of the gyro offset and is given by the following equation:

$$mv = \frac{Bv(to) + Bv(t1)}{(t1 - to)^2}$$

The magnetized amount Mn can be obtained by calculating a change in the vehicle heading, which is caused as the vehicle turns, from the output of the gyro 43 and by calculating the center of a geomagnetism heading circle from this calculated heading change and from the outputs of the gyro 43 before and after the vehicle turns (see Japanese Patent KOKAI Publication No 63-128222).

The dispersion value $Xn^2$ of the magnetized amount Mn is a dispersion value that is included in the magnetized amount Mn to be calculated each time the vehicle turns.

The magnetized amount change $\delta Mn$ is a change in the magnetized amount as the vehicle is subjected to a great change of the magnetic field during traveling (the moving direction and magnitude of the center of the geomagnetism heading circle), and $Yn^2$ is a dispersion value of the magnetized amount change $\delta Mn$.

If, for example, the last magnetized amount is B and a new magnetized amount is A, the magnetized amount change $\delta Mn$ is calculated by the following equation:

$$\delta Mn = k1 + k2A + k3B + k4AB + k5A^2B^2 - B$$

where k1−k5 are coefficients. The coefficients k1−k5 are calculated based on data as a specific vehicle was actually magnetized. The dispersion value $Yn^2$ is the remainder as the coefficients k1−k5 were determined in the above method.

Figure 4:
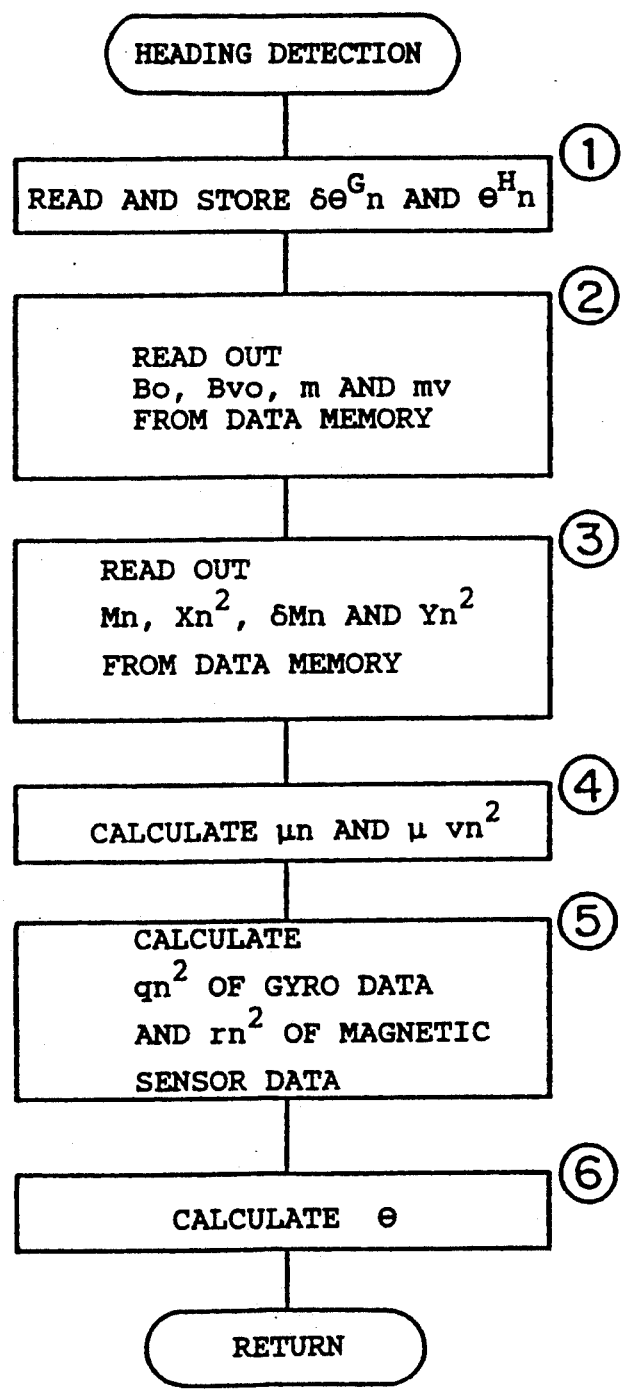
FIG. 4 is a flow chart showing the heading detecting procedure of the apparatus of FIG. 2 for calculating the heading of a vehicle in accordance with the principles of this invention.

The vehicle heading detecting procedure by the apparatus constructed as described above will hereinafter be described in detail. During traveling, the vehicle location and map are displayed on the display 7 in accordance with the individual sensor output data read and stored in the locator 1, but, during the display, the individual output data from the sensors are also read in and stored with an interruption at intervals of a constant time and the vehicle heading is updated. FIG. 4 shows the vehicle heading detecting flow at the time of this interruption. It is noted that this interruption may also be made at intervals of a constant distance that is calculated based on the output data indicative of the distances traveled by the vehicle. The constant time or constant distance is suitably set, depending upon the type of turning angular velocity sensors to be used, functional performance of magnetic sensors to be used and the like.

In step 1, the output data $\delta\theta^G n$ of the gyro 43 and the output data $\theta^H n$ of the magnetic sensor 42 are read in and stored.

Next, in step 2, the gyro offset value Bo, dispersion Bvo of the gyro offset, estimated change rate m of the gyro offset and the dispersion mv of the gyro offset change rate are read out from the data memory 6.

Next, in step 3, the magnetized amount Mn, dispersion value $Xn^2$ of the magnetized amount Mn, magnetized amount change $\delta Mn$ and the dispersion value $Yn^2$ of the magnetized amount change $\delta Mn$ are read out from the data memory 6. The magnetized amount Mn and the dispersion value $Xn^2$ of the magnetized amount Mn are obtained only under specific conditions, such as curve traveling and the like, and the latest values are not always obtained during traveling.

Then, in step 4, a current estimated magnetized amount $\mu n$ and the dispersion value $\mu v n^2$ are calculated by the following equations:

$$\mu n = an\, Mn + (1 - an)(Mn - 1 + \delta Mn)$$

$$an = \frac{Yn^2 + \mu\, vn - 1^2}{Xn^2 + Yn^2 + \mu\, vn - 1^2}$$

$$\mu vn^2 = an\, Xn^2$$

where an is a Kalman filter coefficient.

Then, based upon the read out individual data, a current estimated heading of the vehicle is calculated. In order to obtain the current estimated heading, in step 5, a dispersion $qn^2$ of the output data $\delta\theta^G$ of the gyro 43 and a dispersion $rn^2$ of the output data $\theta^H$ of the magnetic sensor 42 are calculated respectively by the following equation:

$$qn^2 = qo^2 + \sqrt{mv}\, T$$

where T is a time since the last stop of the vehicle, qo is an error that does not relate to the stop time and represented by the sum of an error of quantization and an error $$\sqrt{B\,vo}$$

of the gyro offset, and $$\sqrt{mv}$$

T is equal to an error of the gyro offset change rate times an elapsed time T since the last stop and becomes an error resulting from the gyro offset change.

The dispersion $rn^2$ of the output data $\theta^H$ of the magnetic sensor 42 is expressed by the following equation:

$$rn^2 = r_D^2 + r_Q^2 + r_L^2 + (\tau n^2 - \sigma n - 1^2) + r_{\mu n}^2$$

where:
- $r_D$ = constant part of an error that is included in the output data $\theta^H$ of the magnetic sensor 42,
- $r_Q$ = quantization error = 1/(2 times geomagnetism level),
- $r_L$ = level error = $0.7 \times$ | geomagnetism level difference |/(estimated value of geomagnetism level),
- $\tau n$ = difference between the heading data to be calculated from the output of the gyro 43 and the heading data of the magnetic sensor $42 = (\theta n - 1 + \delta\theta n) - \theta n^H$,
- $\tau n - 1^2$ = dispersion of the last estimated heading $\theta n - 1$,
- $\sigma n^2 - \sigma n - 1^2$ = dispersion to be included in $\sigma n$ - dispersion of the last estimated heading $\theta n - 1$ = dispersion that is newly included in the estimated heading, and
- $r_{\mu n}^2$ = dispersion of the magnetic sensor resulting from the dispersion of the magnetized amount.

It is assumed that the various errors described above arise independently of one another, and the dispersions $qn^2$ and $rn^2$ are obtained by the sum of dispersion values based on the individual factors.

In step 6, by using $qn^2$ and $rn^2$, an estimated heading $\theta$ in which errors are taken into consideration is calculated by the following equation:

$$\theta n = \beta n\, \theta n^H + (1-\beta n)(\theta n - 1 + \delta\theta n^G)$$

where $\theta n$ is an estimated heading to be calculated with a new interruption, $\theta n - 1$ is the last estimated heading, $\delta\theta n^G$ and $\theta^H n$ are sensor output data that are used as a new estimated heading is calculated, and $\beta n$ is a variable of $0 < \beta < 1$ and a Kalman gain. By using the last Kalman gain $\beta n - 1$, $\beta n$ is calculated by the following equation:

$$\beta n = \frac{qn^2 + \sigma n - 1^2}{qn^2 + rn^2 + \sigma n - 1^2}$$

The dispersion of the estimated heading is calculated by the following equation:

$$\sigma n^2 = \beta n\, \sigma n^2$$

As described above, the mean and dispersion of the gyro offset estimated value, the mean and dispersion of the rate of change of the estimated value, the mean and dispersion of the magnetized amount to be included in the magnetic sensor output and the mean and dispersion of the amount of change of the magnetized amount are respectively calculated and stored. Then, when the estimated heading of a traveling vehicle is obtained, the dispersions to be included in the output data of the both sensors are respectively calculated from the stored data. Based on the calculated dispersions, the individual data are processed with a weighting processing method. As a result, the estimated heading can be obtained with high accuracy. That is to say, according to the present invention, the current heading of the moving body can be estimated accurately by individually analyzing and evaluating the error factors that are respectively included in the heading data of the magnetic sensor and in the angular velocity data of the turning angular velocity sensor and by determining the rate of use of the output data of the turning angular velocity and magnetic sensors. Based on this estimated heading and the distance data of the wheel sensor 41, a current estimated location of the vehicle can be calculated. At the same time, it is a matter of course that the current estimated location of the vehicle may be corrected by a known map matching method, in which an estimated location is corrected by comparing it with road map data and evaluating a correlated rate between the estimated location and the road map data.

Figure 5:
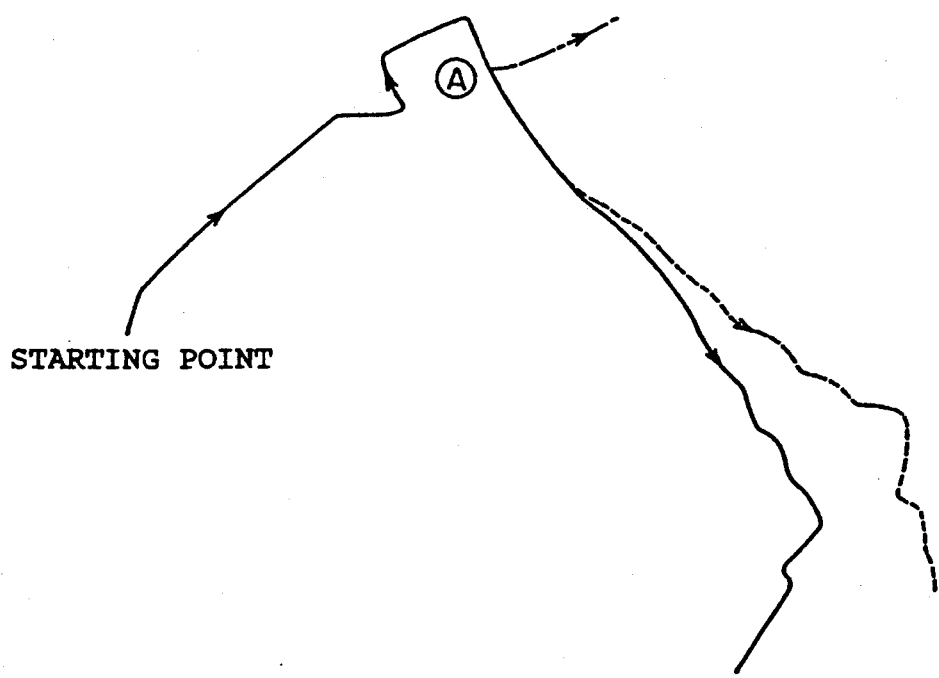
FIG. 5 illustrates the travel track of the vehicle that was obtained by the use of the heading detecting apparatus of this invention.

FIG. 5 illustrates the travel track of a vehicle that was obtained with the use of the heading detecting apparatus described above. The vehicle was magnetized as it passed through an A point (railroad crossing). Thereafter, a great error was caused to occur in the geomagnetism heading because of the magnetization of the vehicle. Since conventional heading detecting apparatuses greatly undergo the influence of the vehicle magnetization, the vehicle track was greatly departed from the actual route traveled by the vehicle (solid line), as shown by the alternate long and short dash line in FIG. 5. On the other hand, in the heading detecting apparatus of the present invention, the vehicle track becomes as shown by the broken line.

While the heading detecting apparatus of the subject invention has been specifically in relation to vehicles, it is note that it is also applicable to moving bodies such as aircraft, ships, etc. Also, while the subject invention has been described with relation to the preferred embodiment thereof, various modifications and adaptations thereof will now be apparent to those skilled in the art. All such modifications and adaptations as fall within the scope of the appended claims are intended to be covered thereby.

What I claim is:

1. In a navigation system for a vehicle comprising:
   a turning angular velocity sensor for sensing a heading of a moving body;
   a magnetic sensor for sensing the heading of said moving body;
   a locator connected to said turning angular velocity and said magnetic sensor for determining a current estimated heading of said moving body from said magnetic sensor output and from said turning angular velocity sensor output,
   a navigation controller responsive to the current heading determined by said locator to determine the current location of said vehicle with respect to a map, and means to display the location of said vehicle on said map; the improvement wherein said locator comprises:

first means connected to said turning angular velocity sensor for calculating an offset value that is included in an output of said turning angular velocity sensor as said moving body is in its stopped state and for calculating an error of said offset value;

second means connected to said first means for calculating a time change rate of said offset value and an error of said time change rate;

third means connected to said first means and to said second means for calculating a current error that is included in the output of said turning angular velocity sensor, in accordance with said error of said offset value multiplied by an elapsed time after said moving body starts traveling and with said error of said time change rate of said offset value multiplied by said elapsed time after said moving body starts traveling;

fourth means connected to said magnetic sensor for calculating a degree of magnetization of said moving body and an error of said degree of magnetization from heading data outputted from said magnetic sensor under a predetermined condition as said moving body is in its travelling state;

fifth means connected to said fourth means for calculating a change in said degree of magnetization of said moving body and an error of said change from heading data outputted from said magnetic sensor as said moving body is in its traveling state;

sixth means connected to said fifth means for calculating a current degree of magnetization of said moving body and an error of said current degree of magnetization in accordance with said degree of magnetization of said moving body and said error of said degree of magnetization that were calculated by said fourth means and with said change in said degree of magnetization of said moving body and said error of said change that were calculated by said fifth means;

seventh means connected to said turning angular velocity and magnetic sensors for calculating a change in a difference between the heading data from said turning angular velocity sensor and the heading data calculated from the output of said magnetic sensor;

eighth means connected to said sixth means and to said seventh means for calculating an error that is included in the heading output from said magnetic sensor, in accordance with said change in the difference between the heading data from said magnetic sensor and the heading data to be calculated from the output of said turning angular velocity sensor that was calculated by seventh means and in accordance with said error of the current degree of magnetization of the moving body calculated by said sixth means;

ninth means connected to said third means and to said eighth means for calculating a Kalman filter gain by calculating a reliability of each of the output data of said turning angular velocity and magnetic sensors from said error in the output of said turning angular velocity sensor calculated by said third means and from said error in the heading output data of said magnetic sensor calculated by said eighth means;

tenth means being connected to said ninth means for calculating a current estimated heading of said moving body by processing the heading data calculated from the magnetic sensor output and the heading data calculated from the turning angular velocity sensor output with a weighting processing based upon said Kalman filter gain.

2. A heading detecting apparatus as set forth in claim 1, wherein said predetermined condition as said body is in its traveling state is a condition in which said degree of magnetization of the moving body can be calculated.

3. A heading detecting apparatus as set forth in claim 1, wherein said moving body is a vehicle.

* * * * *